United States Patent [19]

Pike

[11] 3,984,786

[45] Oct. 5, 1976

[54] NOZZLE FOR FREE JET DYE LASER

[75] Inventor: Charles T. Pike, Lexington, Mass.

[73] Assignee: Jersey Nuclear-Avco Isotopes, Inc., Bellevue, Wash.

[22] Filed: May 28, 1975

[21] Appl. No.: 581,648

[52] U.S. Cl. .............................. 331/94.5 L; 356/246
[51] Int. Cl.² ........................................... H01S 3/02
[58] Field of Search ................. 331/94.5 L; 356/246

[56] References Cited
UNITED STATES PATENTS

| | | | |
|---|---|---|---|
| 3,766,489 | 10/1973 | Rosenberg et al. ................ | 331/94.5 |
| 3,805,187 | 4/1974 | Lempicki et al. .................. | 331/94.5 |
| 3,840,304 | 10/1974 | Hirafuji ............................ | 356/246 X |

Primary Examiner—William L. Sikes
Attorney, Agent, or Firm—Weingarten, Maxham & Schurgin

[57] ABSTRACT

A nozzle for a free jet dye laser wherein the nozzle orifice has an adjustable convex contour to permit realization of precisely plane parallel sides in the central jet region. A jet of this precision is desired to support a high quality laser beam for use in laser enrichment apparatus. The precise planar characteristic of the central portion of the jet is achieved by a narrowing of the central portion of the nozzle orifice. A set of adjustment screws are provided to define the specific contour of the narrowing to insure that the sides of the free jet are precisely plane parallel. A system is shown for detecting the degree to which the sides are plane parallel so that an optimum adjustment in the orifice can be achieved.

10 Claims, 11 Drawing Figures

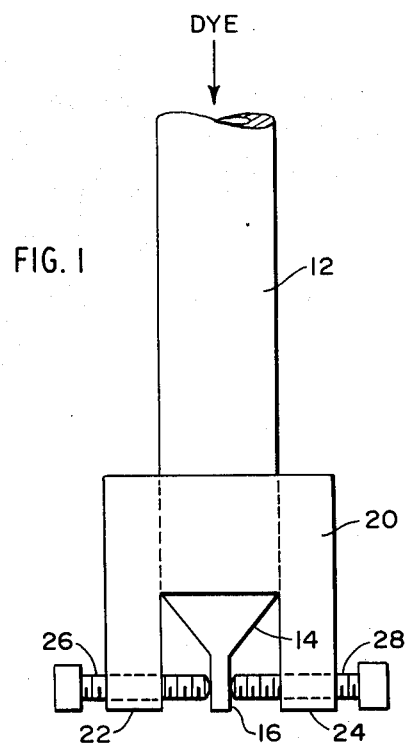
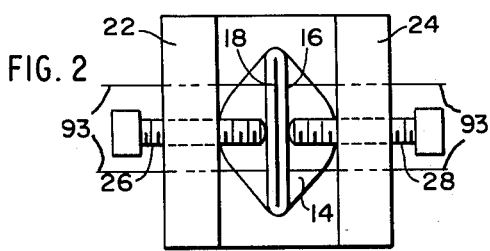
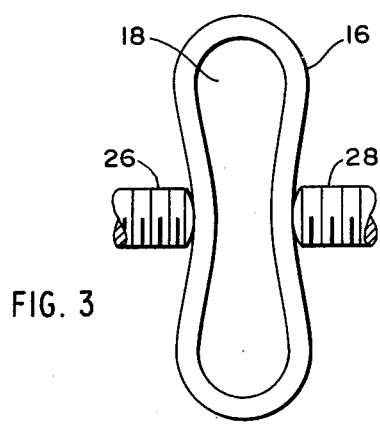
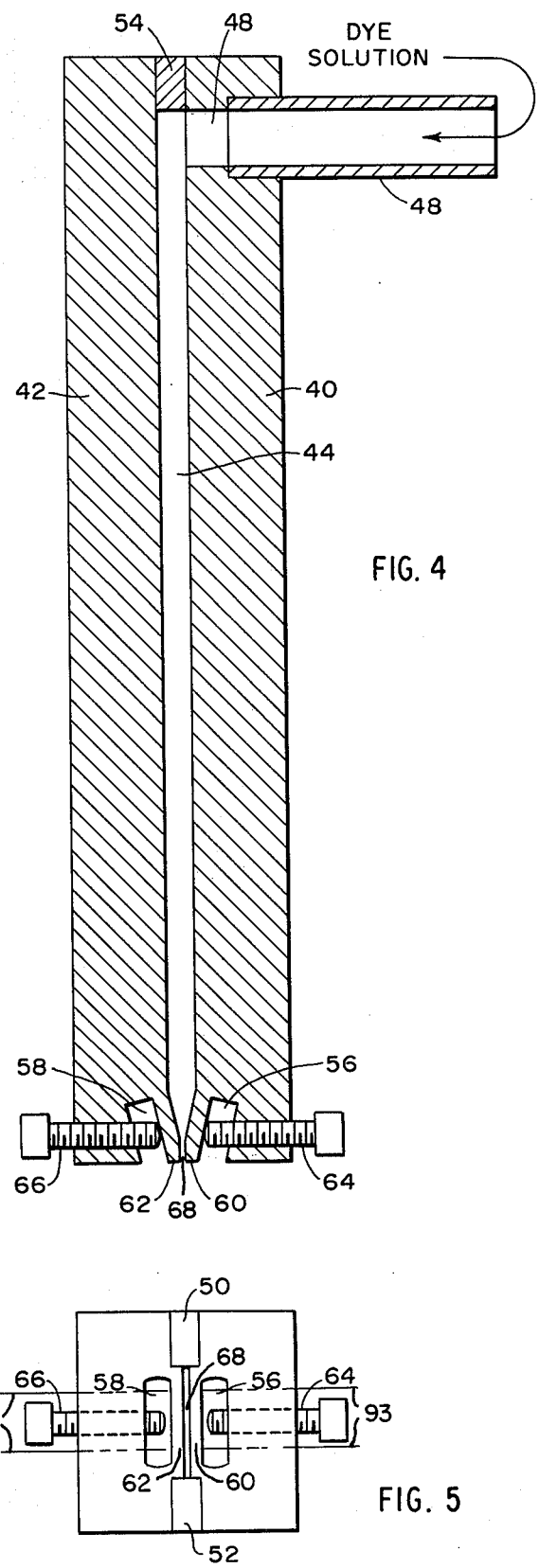
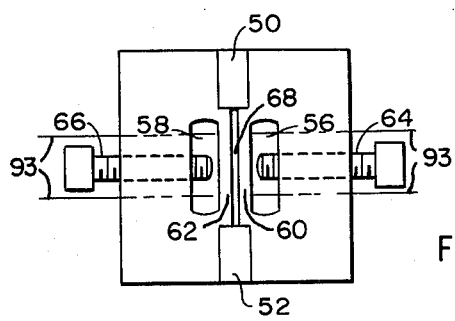

NOZZLE FOR FREE JET DYE LASER

FIELD OF THE INVENTION

This invention relates to nozzles for free jet dye lasers and in particular a nozzle for providing a jet having a central portion of plane parallel sides.

BACKGROUND OF THE INVENTION

In laser applications which require high power densities in master oscillators or amplifiers such as for use in laser enrichment, burning and other problems can occur at the interface between the actively lasing medium and the containment walls for the laser medium. A possible solution to this difficulty is the use of the free jet laser as, for example, shown in U.S. Pat. No. 3,766,489. The free jet eliminates the boundary layer problem in the region of the lasing medium bordering the containment walls.

For use in the laser enrichment application, the free jet must be carefully dimensioned to insure a high quality laser beam, that is one free from distortion and excessive divergence. This is important because it is required that the laser beam for the enrichment application travel great distances with low beam divergence. Such beam quality requires that the actively lasing region of the free jet have precisely plane parallel surfaces which cannot be achieved with such prior art nozzles.

BRIEF SUMMARY OF THE INVENTION

In the preferred embodiment of the present invention, a nozzle for a free jet dye laser is shown in which the nozzle orifice is adjustable to provide a configuration that yields a precisely plane parallel central region to the free jet. The nozzle orifice which provides this free jet characteristic comprises a constriction that is long and narrow in cross-section transverse to the flow of dye medium. Adjustment screws are provided to further narrow the center portion of the constriction and provide a precise control over the contour of the edges of the orifice defining the constriction.

The observed tendency of the dye jet to bunch and thicken in the center is thus counteracted by the central narrowing of the orifice constriction. The degree of this effect is precisely controllable with the adjustment screws to provide a perfectly plane parallel central portion to the free dye jet. The correct adjustment for a plane parallel jet center may be made in a test system or during actual lasing operation of the dye jet. The degree of correction for best beam quality can be obtained by visual observation of the test system or the resulting beam.

Using the nozzle of the present invention, it is possible to correct for first and higher order deviations in the opposite surfaces of the dye jet from a condition of perfectly plane parallel and to achieve a beam of high quality which is desirable for use in laser enrichment apparatus.

BRIEF DESCRIPTION OF THE DRAWING

These and other features of the present invention are more fully described below in the detailed description of the preferred embodiments and in the accompanying drawing of which:

FIG. 1 is a side elevation view of a first embodiment of the dye jet nozzle according to the present invention;

FIG. 2 is a bottom pictorial view of the nozzle of FIG. 1;

FIG. 3 is an enlarged view of the nozzle orifice and adjusting screws used to obtain a desired constriction cross-section in the nozzle orifice;

FIG. 4 is a side sectional view of an alternative nozzle according to the present invention;

FIG. 5 is a bottom pictorial view of the nozzle of FIG. 4;

DETAILED DESCRIPTION OF THE PREFERRED EMBODIMENT

Figure 6:
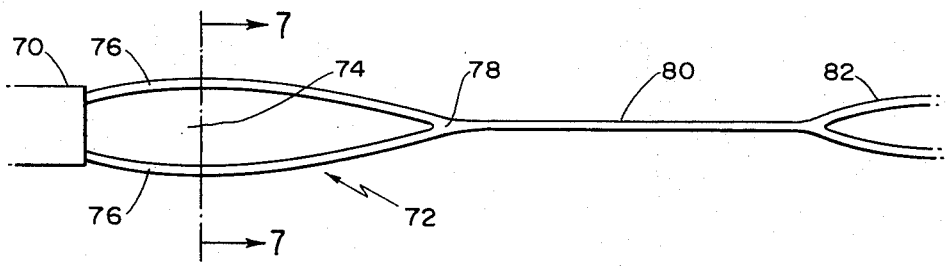
FIG. 6 is a representation of a free dye jet as provided by a nozzle of the present invention.

The present invention contemplates a nozzle for a free jet dye laser which provides a precisely plane parallel central region in the dye jet for high beam quality. The nozzle of the invention has a concave cross-section in the region where it forms the laser dye jet and is adjustable for precise control in achieving the desired jet configuration. FIG. 1 illustrates in elevation one embodiment of such a nozzle having an input conduit 12 which receives a flowing dye solution, typically Rhodamine 6G in an ethylene glycol medium. The conduit 12 may typically be a circular metal pipe and approximately 0.3 centimeters to 1.0 centimeters in diameter. One end of the conduit has a tapered portion 14 leading to a flattened orifice 16 which provides the constriction in the conduit having a cross-section which is generally long and narrow. FIG. 2 shows a bottom view of the nozzle indicating more clearly the opening 18 in the orifice 16.

The end of the conduit 12 is secured in a metal block 20 attached just above the tapered portion 14. The block 20 has first and second arm portions 22 and 24 which extend down to a level with the tip of the orifice 16. The extensions 22 and 24 are set parallel to the long dimension of the cross-section of the orifice 16. First and second adjusting screws 26 and 28 are threaded through the extensions 22 and 24 to encounter the sides of the orifice 16 at the center of the opening 18. The screws 26 and 28 are threaded to provide a fine adjustment in the shape of the opening 18 and in particular to permit a narrowing of the opening 18 in the center where the screws force against it as is illustrated more clearly in an expanded and magnified representation, not necessarily to scale, of the orifice in FIG. 3. By maintaining a positive pressure from the adjustment screws 26 and 28, the orifice can be made to gradually narrow from the ends to the points where the screws contact it.

A second alternative form for the invention is illustrated in FIGS. 4 and 5. In FIG. 4 a sectional view of a nozzle is shown and includes right- and left-hand plate members 40 and 42 having a channel 44 defined therebetween to act as a conduit for a dye solution applied from a pipe 46 into a hole 48 in one of the plates 40. The plates 40 and 42 are spaced to define the channel 44 by edge spacers 50 and 52 which are illustrated in FIG. 5 showing a bottom view of the nozzle of FIG. 4.

At the top of the channel 44, a plug 54 prevents flowing of the dye solution upwards. A section of each end of each plate 40 and 42 bordering the channel 44 is machined out to leave depressions 56 and 58 and relatively thin portions 60 and 62 of the plates between the depressions 56 and 58 and the channel 44. Adjusting screws 64 and 66 are threaded through from outside edges of the plates 40 and 42 to contact the thin end portions 60 and 62 to permit a slight narrowing of the slit 68 defined between the thin end portions 60 and 62 thereby producing the nozzle orifice in the configuration of the present invention.

In the preferred embodiment of the invention, the orifice is typically 0.25 cm to 5 cm in length and 0.25 mm to a few mm in width of opening.

With respect to FIG. 6, there is a pictorial and diagrammatic view of a free jet 72 as it would be typically provided from a nozzle 70 which may be the nozzle of either FIGS. 1 and 2 or FIGS. 4 and 5. The jet 72 has typically an arrowhead shape with a central portion 74, which is to be activated in an inner region for lasing, and outer portions 76 which tend to show a bunching of the fluid due to surface tension effects. Beyond a point 78 where the jet comes together again after leaving the nozzle 70, it will again separate in a plane orthogonal to the original plane for a similar distance after which it will converge and reseparate again in an orthogonal plane to produce a series of sections 82, etc. as shown in FIG. 6. Ultimately, the jet will deteriorate into a series of drops. In order to prevent the jet from emerging as a series of drops, it should be characterized by a low Reynolds number. The use of ethylene glycol facilitates achieving this result.

Figure 7:
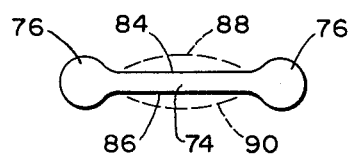
FIG. 7 is a cross-sectional view of the dye jet of FIG. 6.

A cross-section of the jet 72 is illustrated in FIG. 7, showing the thicker edge portions 76 bordering central portion 74. The central portion 74 is illustrated as having plane parallel surfaces 84 and 86 which can be achieved accurately only by the concave or narrowed center pattern for the orifice slit as described above. An orifice configuration having strictly parallel slits will tend to produce some degree of bowing in the central portion 74 of the jet as illustrated by the dotted lines 88 and 90.

The plane parallel quality to the surface 84 and 86 of the jet 72 is of significance in maintaining beam convergence over substantial distances of many meters encountered in the application as a laser amplifier or master oscillator for uranium or isotope enrichment in general.

Figure 8:
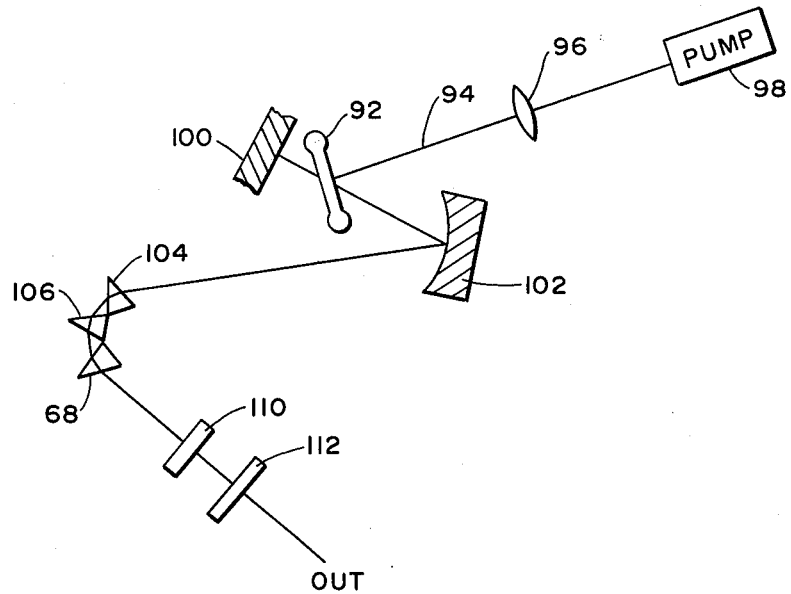
FIG. 8 is a schematic view of a laser application employing a dye jet according to the present invention.

FIG. 8 illustrates a configuration where such a jet may be useful as a master oscillator for generating a specific frequency laser beam of high optical quality suitable for amplification and for use throughout a uranium enrichment plant of the type illustrated in U.S. Pat. No. 3,772,519 or U.S. Pat. No. 3,939,354. In FIG. 8, there is illustrated such a master oscillator employing a free jet 92 which is excited to a lasing condition by an input laser beam 94 through a lens 96 from a laser pump source 98 such as a nitrogen laser. The jet 92 lases within a cavity defined by a 100% reflecting mirror 100 placed to one side of the jet 92 to reflect radiation back toward the active portion of the jet 92. A 100% reflecting, converging mirror 102 is positioned on the other side of the jet 92 to reflect radiation through a set of frequency selecting prisms 104, 106 and 108 and sequentially through a frequency limiting filter 110, such as an etalon filter, and partially reflecting output mirror 112 which returns a portion of the radiation to the cavity through the filters 110, 108, 106 and 104, and through the mirror 102 to the dye cell 92. Radiation taken from the mirror 112 may be directed to a series of amplifiers and power amplifiers to generate a final high power beam which is to be utilized throughout the laser enrichment plant.

While some beam divergence is to be expected in any laser, such divergence can be controlled or compensated so long as the beam quality is sufficient to provide uniform and nontime-varying divergence patterns. In order to insure this high degree of beam quality necessary for long beam runs through a laser enrichment plant, it is important to provide a precisely defined and consistent plane parallel central portion for the dye jet 92 by employing nozzles of the invention illustrated above.

More than one pair of opposed adjustment screws as illustrated above in the two views of the invention may be employed, as for example a pair of adjustment screws placed generally in locations 93 parallel and to either side of the screws 26 and 27 or 64 and 66 in FIGS. 1 and 4 respectively, toward the ends of the constriction of each orifice. Such additional pairs of adjustment screws can be employed to provide correction for higher order distortions in the surfaces of the free jet.

Figure 9:
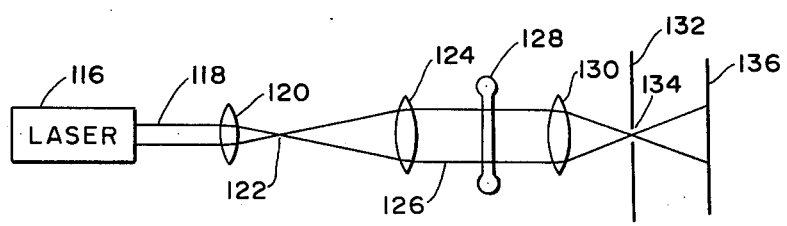
FIG. 9 is a schematic view of a test system for adjusting the nozzle of the present invention.
Figure 10A:
FIGS. 10A and 10B illustrate two images formed in the test system of FIG. 9.
Figure 10B:

In order to determine the proper adjustment of the pair or pairs of adjustment screws illustrated in the present invention, a free jet dye laser of the type illustrated in FIG. 8 may be employed, and the divergence of the laser output beam adjusted for minimum. Preferably, however, a test system of the type illustrated in FIG. 9 is employed. As shown there, a laser 116 which may be any laser adjusted for good collimation in the output beam applies its output radiation 118 through a converging lens 120 to provide a convergence to a point 122 and expansion through a further converging lens 124 to provide a coherent output beam 126 of expanded width, typically corresponding to the cross-sectional area of the free jet region to be employed for active lasing. The beaam 126 is applied to a free jet 128 produced by a nozzle according to the present invention which can be adjusted in the degree to which the surfaces of the central portion are parallel. The beam 126 is directed substantially orthogonal to the surface of the jet 128. The jet 128 is employed in the present invention not for lasing but as a refractive optical element. The beam 126 after passing through the jet 120 is applied to a converging lens 130 which converges the beam to a point. A pinhole plate 132 is placed with its pinhole aperture 134 at the convergence point for the radiation from the lens 130. The radiation passing through the pinhole 134 is applied to a viewing screen 136 to provide an image. As illustrated in FIG. 10A, an image 138 formed on the screen 136 will show a line 140. The adjustment screws in the nozzle of the present invention may then be set to the point where the line is at its widest as for example in line 142 illustrated in FIG. 10B.

Other modifications or variations on the nozzle illustrated above may be implemented within the spirit and scope of the present invention. It is accordingly intended to define the scope of the invention only in accordance with the following claims.

What is claimed is:

1. A nozzle for a free jet dye laser comprising:
a conduit for a laseable dye solution;
an orifice in said conduit at an end thereof;

said orifice having a cross-section transverse to the direction of flow of dye in said conduit;

means for supplying a flow of dye solution in said conduit toward the orifice end; and means for narrowing the cross-sectional shape of said orifice to a generally concave pattern so as to provide in the jet of dye solution flowing out of said nozzle a region of substantially plane parallel surfaces.

2. The nozzle of claim 1 further including means for causing lasing in the plane parallel region of the jet of dye solution thereby to produce a laser beam of high quality.

3. The nozzle of claim 1 wherein said means for narrowing said cross-sectional shape includes adjustment screws for narrowing said orifice in the center portions thereof.

4. The nozzle of claim 3 wherein said adjustment screws includes first and second screws on opposite sides of said orifice and centrally placed thereof.

5. The nozzle of claim 4 further including additional adjustment screws on either side of said first and second screws for providing further control over the narrowing of the orifice of the nozzle.

6. The nozzle of claim 1 wherein said orifice is approximately 0.25 millimeters to a few millimeters across transverse to the direction of dye solution flow.

7. The nozzle of claim 1 wherein said conduit includes a tube and the orifice therein is a flattened end of said tube.

8. The nozzle of claim 1 wherein said conduit includes:

first and second wall members; and means for supporting said wall members at edges thereof to define a passage between said wall members and between facing surfaces thereof;

said orifice being formed by end portions of said wall members which are narrowed in the separation between the facing surfaces of said wall members.

9. The nozzle of claim 1 further including means for providing an indication of the degree to which the surfaces of said free jet are plane parallel.

10. The nozzle of claim 9 wherein said narrowing means includes means for adjusting said cross-sectional shape to vary the degree to which the surfaces at the central region of said free jet are parallel.

* * * * *